Figure 1:
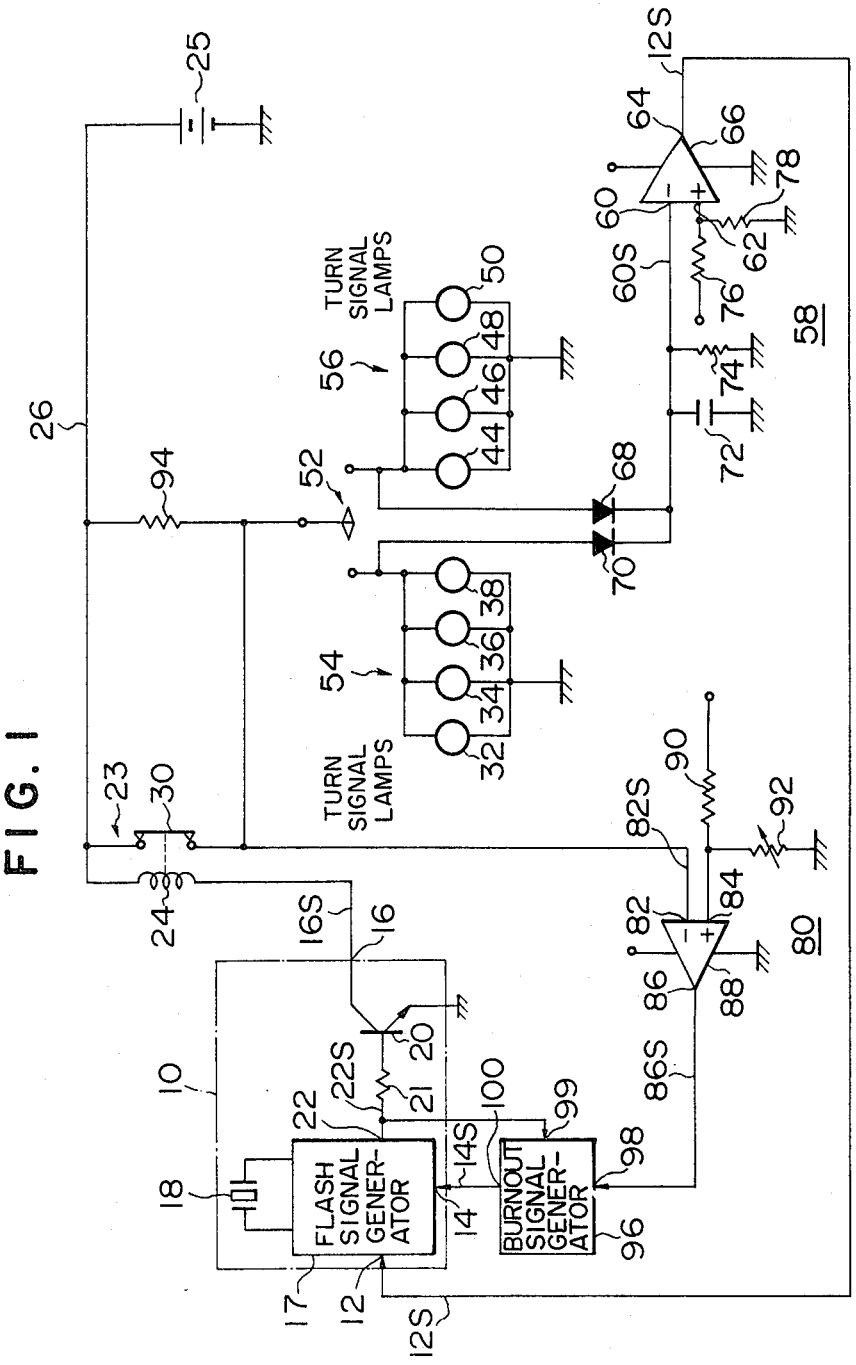

United States Patent [19]

Kugo et al.

[11] 4,349,810

[45] Sep. 14, 1982

[54] SIGNAL LAMP APPARATUS WITH A LAMP BURNOUT DETECTING CIRCUIT

[75] Inventors: Masaru Kugo, Ibaraki; Osamu Igarashi, Katsuta, both of Japan

[73] Assignee: Hitachi, Ltd., Tokyo, Japan

[21] Appl. No.: 139,670

[22] Filed: Apr. 14, 1980

[30] Foreign Application Priority Data

Apr. 16, 1979 [JP] Japan ................. 54-45414

[51] Int. Cl.³ .................. B60Q 1/38; G08B 21/00
[52] U.S. Cl. ..................... 340/79; 340/81 R; 340/73; 340/331; 340/642; 315/200 A
[58] Field of Search ........... 340/81 R, 81 F, 80, 340/73, 72, 67, 74, 84, 76, 331, 641, 642, 79; 315/200 A; 307/10 LS

[56] References Cited

U.S. PATENT DOCUMENTS 3,408,625  10/1968  Skinner ................. 340/81 R
4,150,359   4/1979  Mizuno et al. ........... 340/81 R Primary Examiner—Thomas A. Robinson
Assistant Examiner—Donnie Lee Crosland
Attorney, Agent, or Firm—Craig and Antonelli

[57] ABSTRACT

A signal lamp apparatus with a lamp burnout detecting circuit has a right turn signal lamp group and a left turn signal lamp group which are connected to a power source through a turn signal switch and a relay contact coupled in parallel with a burnout detecting resistor. Each of the lamp groups includes a plurality of signal lamps connected in parallel with one another. The apparatus includes a comparator which produces an output signal when the voltage across the signal lamp group is higher than a predetermined voltage, and a device which produces a burnout signal when the comparator has an output signal after lights-out, for example, after 20 to 100 m sec since the relay contact is opened. With such an arrangement, the burnout of the signal lamp or lamps may be detected while the signal light lamp group is flashing.

7 Claims, 2 Drawing Figures

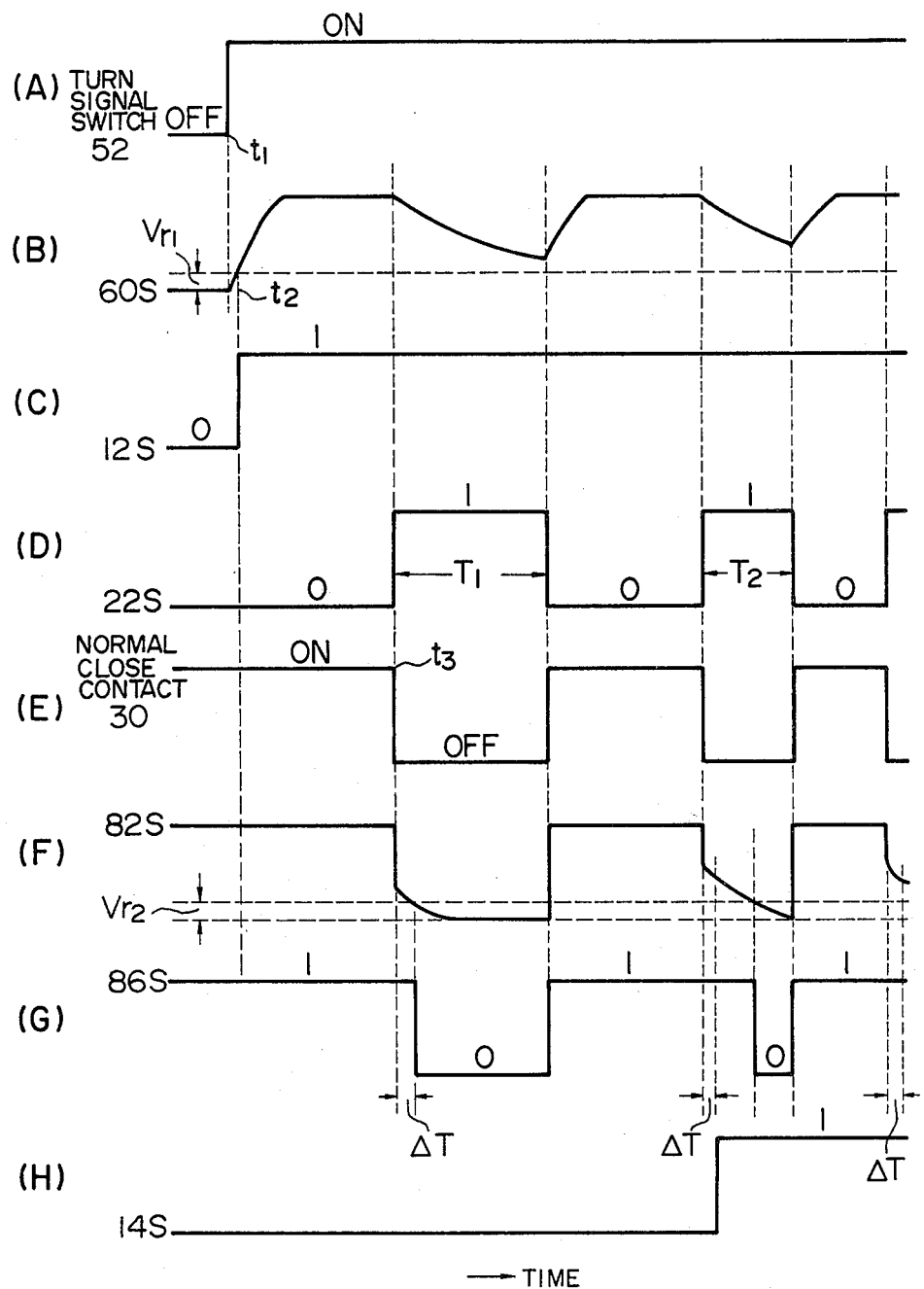

SIGNAL LAMP APPARATUS WITH A LAMP BURNOUT DETECTING CIRCUIT

This invention relates to a signal lamp apparatus with a lamp burnout detecting circuit and, more particularly, to a turn signal indicating lamp apparatus of a motor vehicle.

In general, a turn signal lamp apparatus for a motor vehicle performs certain functions such as (a) in the operation thereof, flashing a plurality of signals with a given period of timing, (b) in the failure of lamp or lamps, shortening the flashing period to indicate the failure of the lamp to a driver.

In a conventional signal lamp apparatus a given current is fed from a power source through a burnout detecting resistor with a low resistance to a plurality of signal lamps connected in parallel with one another. A change of the potential difference across the signal lamps is monitored for the burnout detection. Such an apparatus is disclosed in U.S. Pat. No. 3,408,625 granted to Skinner, Oct. 29, 1968.

In the operation of the signal lamp apparatus, the respective signal lamps are directly connected to the power source. For this reason, the burnout detecting device is designed to operate only in the non-operative condition of the apparatus. The conventional burnout detecting device fails to detect the burnout occurring in the course of the operation of the signal lamp apparatus.

The resistance of the filament of the lamp at the time of a lights-out condition is about 1/10 that at the time the lights are energized. In a signal lamp having a normal voltage 12 V and a normal wattage 25 W, for example, the filament resistance is about $5.76\Omega$ when the lamp is lit and about $0.6\Omega$ when it is not lit. In the case where the four lamps are connected in parallel with each other, the resistance when lit is about $1.44\Omega$ and the resistance when not lit is about $0.15\Omega$. Therefore, in the non-operative condition of the lamp signal apparatus, when the power source feeds current of 1 ampere through the burnout detecting resistor to the lamp, the voltage drop across the signal lamps is 0.15 V. A potential change caused when one signal lamp fails is a mere 0.05 V. This makes it difficult to detect the burnout of the lamp.

Accordingly, an object of the invention is to provide a signal lamp apparatus capable of detecting the burnout of a signal lamp or lamps even in the operation of the signal lamp apparatus.

Another object of this invention is to provide a signal lamp apparatus which can reliably detect the failure of the signal lamp or lamps, with a large voltage change across the signal lamp at the time of the burnout of the lamp.

According to the invention, for detecting the burnout of the signal lamp, during the flashing of the signal lamps, a power source feeds current through a burnout detecting resistor to the lamps immediately after the lamps go out, and a voltage change across the lamps is monitored.

The above and other objects, features and advantages of the invention will be more apparent from the following description taken in connection with the accompanying drawings, in which:

FIG. 1 is a schematic circuit diagram of a signal lamp apparatus with a lamp burnout detecting circuit as an embodiment of the invention; and FIG. 2 is a set of wave forms useful in explaining the operation of the circuit shown in FIG. 1.

Reference is made to FIG. 1 illustrating an embodiment of a signal lamp apparatus with a lamp burnout detecting circuit according to the invention. In FIG. 1, a signal controller 10 has input terminals 12 and 14, an output terminal 16, a flash signal generator 17, a crystal oscillator 18, an NPN transistor 20 and a base resistor 21. When an input signal 12S at the input terminal 12 is a logical '1', the flash signal generator 17 produces an output signal 22S of alternative repetition of '1' and '0' with a predetermined period of time T1 (see FIGS. 2(C) and (D)). When a burnout signal 14S is applied to the input terminal 14, the flash signal generator 17 shortens the period T1 of the signal 22S to a predetermined period of time T2 (see FIGS. 2(H) and (D)). The change of the period of the output signal 22S is made by using a known frequency divider (not shown) in the flash signal generator 17. The oscillating frequency of the flash signal generator 17 is accurately held by the crystal oscillator 18.

The NPN transistor 20 is connected at the collector to a positive terminal 26 of a DC power source 25 via an exciting coil 24, at the base to the flash signal generator 17 via the resistor 21, and at the emitter to ground. The transistor 20, which responds to the output signal 22S from the flash signal generator 17, is ON when the output signal 22S is logical '1' and OFF when it is logical '0'. Accordingly, a normally closed contact 30 of the relay 23 opens and closes in accordance with the ON and OFF operations of the transistor 20 to produce a signal with a wave shape as shown in FIG. 2(E).

Left turn signal lamps 32, 34, 36 and 38 provided on the left side of a motor vehicle and right turn signal lamps 44, 46, 48 and 50 on the right side are connected in parallel, as shown. One end of the parallel circuit of the turn signal lamps is connected to the positive terminal 26 of the DC power source 26, through a route including a turn signal switch 52, and the normally closed contact 30 of the relay 23. When the turn signal switch 52 turned to the left by a driver, the left turn signal lamps are turned on, while when it is turned to the right, the right turn signal lamps are turned on.

A comparator 58 has an operational amplifier 66 with input terminals 60 and 62, and an output terminal 64, forward diodes 68 and 70 for supplying the voltages across the right and left turn signal lamp groups 68 and 70 to the input terminal of the operational amplifier 66, a capacitor 72 and a resistor 74 which are connected to the input terminal 62 of the operational amplifier 66, and resistors 76 and 78 for supplying a reference voltage Vr to the input terminal 62 of the operational amplifier 66. The output terminal 64 of the operational amplifier 66 is connected to the input terminal of the flash signal generator 17. When the turn signal switch alternately repeats the open and closed operations, a signal 60S as shown in FIG. 2(B) is applied to the input terminal 60 of the amplifier 66, so that the output signal 12S shown in FIG. 2(C) becomes logical '1'.

A comparator 80 has an operational amplifier 88 with input terminals 82 and 84, and an output terminal 86, and a resistor 90 and a variable resistor 92 which are for supplying a reference voltage Vr2 to the input terminal 84. The input terminal 82 of the operational amplifier 88 is connected to the positive terminal 26 of the power source 25, through a resistor 94 connected across the normally closed contact of the relay 23. The output signal 86S (FIG. 2(G)) from the comparator 80 is '1' when the input voltage 82S (FIG. 2(F)) thereof is higher than the reference voltage Vr2, while it is logical '0' when the former is lower than the latter, as shown in FIG. 2.

A burnout signal generator 96 has an input terminal 98 connected to the output terminal 86 of an operational amplifier 88, an input terminal 99 connected to the output terminal 22 of the flash signal generator 17, and output terminal 100 connected to the input terminal 12 of the flash signal generator 17. It is assumed that, after a predetermined time ΔT since the output signal 22S (FIG. 2(D)) from the flash signal generator 17 becomes logical '1', when the output signal 86S (FIG. 2(G)) of the operational amplifier 88 is logical '1', the output signal 14S (FIG. 2(H)) is logical '1'. The time ΔT is selected to be 20 to 100 m sec. A microcomputer is applicable for the burnout signal generator 96 and the flash signal generator 17.

When a driver turns the turn signal switch 52 to the left side at time t1, as shown in FIG. 2, the turn signal lamp 54 lights up. The capacitor 72 is charged through the diode 70, so that the input voltage 60S (FIG. 2(B)) at the input terminal 60 of the operational amplifier 60 exceeds the reference voltage Vr1 at time t2. As a result, the output signal 12S (FIG. 2(C)) of the operational amplifier 66 becomes logical '1'. Accordingly, the signal of logical '1' is applied to the input terminal 12 of the flash signal generator 17. Upon receipt of the signal, the flash signal generator 17 produces the signal 22S (FIG. 2(D)) alternately changing between '1' and '0' with the period T1 at the output terminal 22. The transistor 20 operates in response to the output signal 22S of the flash signal generator 17 to open and close the normally closed contact 30 of the relay 23.

When the normally closed contact 30 of the relay 23 is closed, the input terminal 82 of the operational amplifier 88 is supplied with the power source voltage, so that the logical '1' appears at the output terminal of the operational amplifier 88. When the contact 30 of the relay 23 is opened at time t3, the turn signal lamp group 54 is connected through the resistor 94 to the power source 25. The resistance value of the resistor 94 is set merely to allow the resistance of the lamps 32 to 38 to be measured. Accordingly, the current flowing through the lamps 32 to 38 is retricted to a small value so that the lamps do not light up. Accordingly, the lamp group 54 goes out at time t3. Subsequently, the lamp group 54 repeats the flash operation with the period T1 in a similar manner.

The resistance of the filament of the signal lamp gradually decreases after the normally closed contact 30 of the relay 23 is opened, because it has a resistance temperature coefficient. For this reason, the voltage 82S (FIG. 2(F)) across the signal lamp 54 gradually decreases as shown in FIG. 2(F).

When all the signal lamps 32 to 38 are normal, the voltage 82S falls below the reference voltage Vr2 after a predetermined time ΔT since the contact 30 opens and the output signal from the operational amplifier 88 becomes '0'. Accordingly, the output signal from the burnout signal generator 96 has an output signal 14S (FIG. 2(H)) of logical '0'.

If any one of the signal lamps 32 to 38 is burned out, the voltage 82S (FIG. 2(F)) of the signal lamp group 54 increases immediately after the signal lamps are turned off. As a result, the contact 30 of the relay 23 opens and the voltage 82S across the signal lamp group 54 after the time ΔT exceeds the reference voltage Vr2 and the output signal from the operational amplifier 88 is logical '1'. Therefore, the output signal at the output terminal 100 of the burnout signal generator 96 is logical '1' and the flash signal generator 17 produces the signal 22S with the period T2 (FIG. 2(D)). The period of the contact 30 is shortened from T1 to T2 and the change of the flashing period warns the occurance of burnout to a driver. In the signal lamp apparatus as mentioned above, even during a period that the signal lamps 32 to 38 are flashing, the burnout is detected and a burnout detecting signal 14S (FIG. 2(H)) is produced to warn of the burnout.

The apparatus of the invention detects the resistance of the signal lamp filament immediately after the signal lamps 32 to 38 turn off, for example 20 to 100 m sec, for the purpose of the burnout detection. Assume now that one signal lamp has the capacity of 12 V and 25 W. In this case, the resistance of it is 5.76Ω when the lamp lights and it is about 0.6Ω when it goes out. When four signal lamps are connected in parallel, the resistance is 1.44Ω at the time of the lighting and it is 0.15Ω at the time of the light-out. Accordingly, if current of 1 ampere is fed to the lamps through the resistor 94, the voltage drop across the signal lamp group 54 is 0.15 V at the time of the lights-out condition and is 1.44 V immediately after the lamps are put out. When one of the signal lamps is burned out, the voltage drop across the lamp group is 0.2 V at the time of the lights-out condition and is 1.92 V immediately after the lights-out condition. Therefore, the changed amount of the former case is 0.05 V (=0.2−0.15) and that of the latter case is 0.48 V (=1.92−1.44). Accordingly, the signal lamp apparatus of the invention detecting the voltage drop across the lamp group immediately after the lights-out condition has a large change of the input signal 82S to the comparator 80 when the burnout occurs and therefore suffers from a rare erronous operation.

What is claimed is:

1. A signal lamp apparatus with a lamp burnout detecting circuit comprising:
   a power source;
   a plurality of signal lamps connected in parallel with each other and connected to said power source in series;
   a relay having a pair of contacts connected between said power source and said signal lamps;
   a resistor for detecting the burnout of the lamps which is connected across the contacts of said relay;
   a comparator with a first input terminal connected to a connection point between a contact of said relay and said signal lamps, a second input terminal supplied with a predetermined reference voltage, and an output terminal, which comparator produces an output signal at the output terminal when the voltage at the first input terminal is higher than that at the second input terminal;
   a flash signal generator having a first terminal, a second terminal, and an output terminal connected to said relay, which flash generator produces an output signal having alternately repeating ON and OFF states with a first period at the output terminal when the first input terminal is supplied with a signal and produces an output signal having alternately repeating ON and OFF states with a second period shorter than the first period when the second input terminal is supplied with a signal; and means having an input terminal connected to the output terminal of said comparator and an output terminal connected to the second input terminal of said flash signal generator, for producing a burnout signal when said comparator produces an output signal after a predetermined period of time following the output signal of said flash signal generator changing to the ON state.

2. A signal lamp apparatus with a lamp burnout detecting circuit according to claim 1, in which said flash signal generator includes a transistor connected in series to said relay.

3. A signal lamp apparatus with a lamp burnout detecting circuit comprising:
   a power source;
   a plurality of signal lamps connected in parallel with each other and connected to one side of said power source in series;
   a relay having a pair of contacts connected between the other side of said power source and said signal lamps;
   flash signal generator means for alternately opening and closing the contacts of said relay at a predetermined frequency;
   a resistor for detecting the burnout of the lamp which is connected to one of the contacts of said relay and to said signal lamps;
   a comparator with a first input terminal connected to a connecting point between the other contact of said relay and said signal lamps, a second input terminal supplied with a predetermined reference voltage, and an output terminal, which comparator produces an output signal when the voltage at the first input terminal is higher than that at the second input terminal;
   means connected to the output terminal of said comparator for producing a burnout signal when said comparator produces an output signal after a predetermined period of time following the time said relay contacts open.

4. A signal lamp apparatus for a motor vehicle with a lamp burnout detecting circuit comprising:
   a power source;
   a plurality of left turn signal lamps connected in parallel with one another and connected in series with said power source;
   a plurality of right turn signal lamps connected in parallel with each other and connected in series with said power source;
   a relay with a pair of contacts connected between said power source and said left turn signal lamps and said right turn signal lamps;
   a turn signal switch connected to the contacts of said relay and said left turn signal lamps and said right turn signal lamps, which selectively connects said left and right turn signal lamps to the contacts of said relay;
   a burnout detection resistor connected in parallel with the contacts of said relay;
   a first comparator with a first input terminal connected to the connection point of said relay contacts and said turn signal switch, a second input terminal supplied with a predetermined reference voltage, and an output terminal at which said first comparator produces an output signal when the voltage at the first input terminal is higher than that at the second input terminal;
   a flash signal generator having a first input terminal, a second input terminal and an output terminal connected to said relay, which flash generator produces an output signal having alternately repeating ON and OFF states with a first period at the output terminal when a signal is applied to the first input terminal, and produces an output signal having alternately repeating ON and OFF states with a second period shorter than the first period when a signal is applied to the second input terminal;
   means with an input terminal connected to the output terminal of said first comparator and an output terminal connected to the second input terminal of said flash signal generator for producing a burnout signal when said comparator produces an output signal after a predetermined period of time following the output signal of said flash generator changing to the ON state.

5. A signal lamp apparatus for a motor vehicle with a lamp burnout detecting circuit according to claim 4, further comprising a second comparator having a first input terminal connected between said turn signal switch, and said left turn signal lamps and said right turn signal lamps, a second input terminal supplied with a second given reference voltage, and an output terminal connected to the first input terminal of said flash signal generator, which flash generator produces an output signal at the output terminal thereof when the voltage at the first input terminal is higher than that at the second input terminal.

6. A flash signal lamp apparatus having a burnout detecting system comprising:
   a plurality of flash signal lamps connected in parallel;
   switching means for intermittently energizing said plurality of flash signal lamps to effect illumination thereof in an on-off manner by intermittently supplying the flash signal lamps with voltage from a power source, said switching means operating to connect the power source and the flash signal lamps in series;
   a resistor connected to said switching means in parallel, the value of said resistor being such as to make it possible to measure the resistance of the flash signal lamps without effecting illumination thereof; and
   generator means for generating first and second trains of electrical pulses which have different predetermined periodic times for application to said switching means whereby said switching means intermittently operates to effect ilumination of the flash signal lamps at selectively-different rates, including means connected to said resistor for detecting burnout of at least one of the flash signal lamps by detecting that the voltage across the flash signal lamps a predetermined time after operation of said switching means to deenergize said lamps is larger than the voltage across the flash signal lamps immediately before operation of said switching means to turn said lamps on and means responsive to said detecting means for supplying said first train of electrical pulses to said switching means during normal operation of said lamps and for supplying said second train of pulses to said switching means when at least one of said lamps is burned out.

7. A flash signal apparatus according to claim 6, wherein said generator means comprises a microcomputer.

* * * * *